(12) United States Patent
Vlug

(10) Patent No.: US 8,069,969 B2
(45) Date of Patent: Dec. 6, 2011

(54) TRANSPORT DEVICE

(75) Inventor: Casper Hermanus Gerardus Vlug, TJ Bij Duurstede (NL)

(73) Assignee: Van Riet Equipment B.V., Nieuwegein (NL)

( * ) Notice: Subject to any disclaimer, the term of this patent is extended or adjusted under 35 U.S.C. 154(b) by 280 days.

(21) Appl. No.: 12/296,447

(22) PCT Filed: Apr. 6, 2007

(86) PCT No.: PCT/NL2007/050147
§ 371 (c)(1),
(2), (4) Date: Aug. 14, 2009

(87) PCT Pub. No.: WO2007/117142
PCT Pub. Date: Oct. 18, 2007

(65) Prior Publication Data
US 2009/0301846 A1  Dec. 10, 2009

(51) Int. Cl.
*B65G 47/46* (2006.01)
(52) U.S. Cl. .................................. 198/370.02
(58) Field of Classification Search ............. 198/370.02, 198/370.03
See application file for complete search history.

(56) References Cited

U.S. PATENT DOCUMENTS

| | | | | |
|---|---|---|---|---|
| 4,971,190 | A * | 11/1990 | Berends et al. | 198/370.02 |
| 5,275,273 | A * | 1/1994 | Veit et al. | 198/370.02 |
| 6,860,376 | B1 * | 3/2005 | Heit et al. | 198/370.02 |
| 6,910,567 | B2 * | 6/2005 | Van Den Goor | 198/370.02 |
| 7,506,743 | B2 * | 3/2009 | Enomoto | 198/370.02 |
| 2004/0089513 | A1 * | 5/2004 | Van Den Goor | 198/370.02 |
| 2006/0060447 | A1 * | 3/2006 | Ramaker et al. | 198/370.02 |
| 2007/0215436 | A1 * | 9/2007 | Enomoto | 198/370.02 |

FOREIGN PATENT DOCUMENTS

| | | |
|---|---|---|
| NL | 1 020 825 C2 | 12/2003 |
| WO | 03/076310 A2 | 9/2003 |

OTHER PUBLICATIONS

International Preliminary Report on Patentability, International Preliminary Examining Authority, Apr. 3, 2008.

* cited by examiner

*Primary Examiner* — James R Bidwell
(74) *Attorney, Agent, or Firm* — DeMont & Breyer, LLC

(57) ABSTRACT

A transport device for objects comprises a frame with a series of carriers that run mutually parallel and are pivotally coupled to an endless drivable moving track so as to enable displacement in a direction of displacement. At least some of the carriers comprise pusher shoes with guiding construction that are shiftable along the relevant carriers transversely of the direction of displacement using guide means arranged on the frame. The guiding construction comprises a guide pin with a guide body arranged thereon, wherein the guide pin comprises at least two portions of differing diameter, that the guide means comprise a guide channel in which the guide pin can engage, and that the depth of the guide channel progresses such that, at first engagement, the portion of the guide pin with the largest diameter engages in the guide channel, and with further engagement a portion with a smaller diameter.

12 Claims, 7 Drawing Sheets

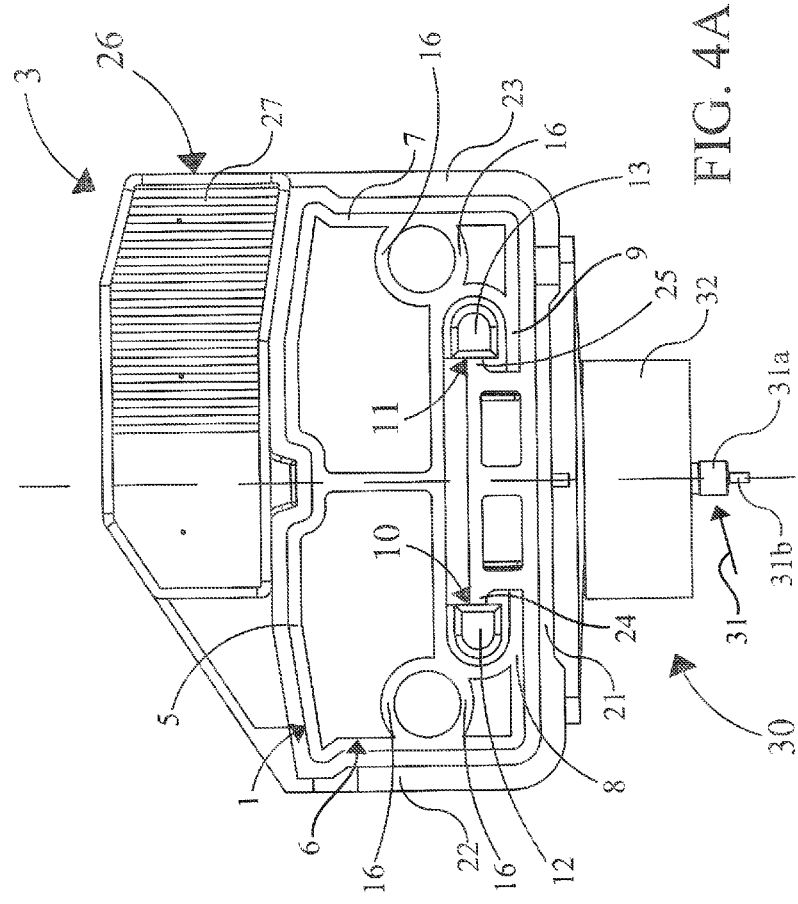

TRANSPORT DEVICE

FIELD OF THE INVENTION

The invention relates to a transport device for objects.

BACKGROUND OF THE INVENTION

Such a device is known from the Netherlands patent NL 1020825. The known device is frequently applied for the transport of objects, wherein objects resting on the moving track can be discharged laterally of the moving track at desired locations by shifting in a determined direction along the carriers a number of pusher shoes which push the relevant object from the moving track transversely of the direction of displacement. In this manner the objects can for instance be pushed away laterally onto another moving track, whereby the objects, for instance parcel post, can be sorted.

The increasing quantity of objects for sorting has resulted in a need to further increase the capacity of the known device so that more objects can be sorted per unit of time. With the known device the maximum attainable throughput speed has practically already been achieved. At a typical throughput speed of about 3 m per second the design length of a moving track is generally limited to about 150 m, since it would break at greater lengths. This means that a plurality of moving tracks generally have to be placed in series, wherein objects have to be transferred from a first moving track to a second moving track. The high throughput speed creates problems at these transfer locations, wherein objects are no longer transferred smoothly and possibly change position, thereby reducing the predictability. The objects are then no longer located at the preset position on the second moving track, whereby the sorting process is disrupted.

SUMMARY OF THE INVENTION

The invention has for its object to provide a transport device of the type stated in the preamble which does not have, among others, the above stated drawbacks, or does so to lesser extent, and with which a higher capacity can be achieved.

By providing the transport device according to the invention with pusher shoes which comprise a guiding construction which, in co-action with the guide means of the frame, brings about the displacement of the pusher shoes, wherein the guiding construction comprises a guide pin with a guide body arranged thereon, wherein the guide pin comprises at least two portions of differing diameter, wherein the guide means comprise a guide channel in which the guide pin can engage, and wherein the guide channel, and preferably the depth thereof, progresses such that at first engagement the portion of the guide pin with the largest diameter engages in the guide channel, and with further engagement a portion with a smaller diameter. A transport device is obtained wherein a high throughput speed can be achieved without this causing problems in the transfer of objects, in particular relatively small objects. An advantage is hereby also achieved particularly at a switch, wherein among other advantages the switching time of the switch is reduced.

According to the invention, by having the portion with the largest diameter engage first on the engaging surface of the guide channel, the pusher shoe is diverted and an acceleration occurs in the transverse direction (perpendicularly of the throughput direction). After the first engagement the further engagement takes place via a portion of the guide pin with a smaller diameter, wherein substantially guiding forces occur. The transport device is preferably further characterized in that the depth of the guide channel progresses such that with even further engagement the guide body engages in the guide channel. By providing the device in a preferred variant with a switch with guide channel, and by providing according to the invention a stepped pin which can engage at different depth levels of the guide channel, the switch can be switched sooner from a first position, wherein the pusher shoe is not diverted, to a second position wherein the pusher shoe is subjected to a switching movement, whereby a higher throughput speed can be achieved at the same switching speed, this enhancing the capacity of the transport device accordingly. According to the invention the guide body can have any form suitable for guiding. It is thus for instance possible to embody the guide body as guide block or as guide slide. All guide bodies available to the skilled person form part of the invented device. In a preferred embodiment the guide body takes a wheel-like form, wherein the axle of the wheel runs substantially in line with the axis of the guide pin. The guide wheel herein generally has a larger diameter than the other components of the guiding construction of the pusher shoe. It therefore preferably takes over the guiding when a force is exerted by the object for displacing.

Relatively small objects are understood to mean objects with a characteristic dimension of 50-1200 mm, preferably 100-800 mm, more preferably 150-500 mm. In the context of the present application a high throughput speed is understood to mean a throughput speed of at least 1.5 m per second, preferably at least 2 m per second, more preferably at least 2.5 m per second, most preferably at least 3 m per second.

It is advantageous to provide the transport device with carriers wherein the pitch between two pusher shoes situated on successive carriers amounts to a maximum of 130 mm. In the context of this application the pitch is defined as the horizontal distance (or, in the case the moving track runs obliquely, the distance measured parallel to the moving track) between the axes of two successive pusher shoes. The transport device according to the invention is preferably further characterized in that the pitch amounts to a maximum of 115 mm, more preferably a maximum of 105 mm, and most preferably lies between about 100 and 105 mm. By embodying the guiding construction of the pusher shoes according to the invention it becomes possible to limit the pitch. This has a favourable effect on the sorting capacity of the device.

A further preferred embodiment of the transport device according to the invention is characterized in that at least some of the carriers have an arcuate upper surface in the width direction thereof. Although the radius of curvature of the arcuate upper surface can be selected within broad limits, it is advantageous if it lies between 100-800 mm, more preferably between 150-500 mm, most preferably between 200-300 mm. By giving the upper surface of at least some of the carriers an arcuate form a more operationally reliable transfer of objects from one moving track to another is achieved. The pusher shoes of the transport device can have any desired form. A typical pusher shoe comprises an engaging part which extends around the relevant carrier and which as it were encloses the carrier, and along which the pusher shoe can be displaced in longitudinal direction of the carrier, and a push body for pushing away the objects laterally which extends above the level of the upper surface of the carrier and is connected to the engaging part.

A gap is generally present between adjacent carriers. It will be apparent that the gap width may not be too large, so as to avoid objects falling between or getting jammed between the carriers. Conversely, it is preferably the case that the gap width is sufficiently large to allow pusher shoes situated on adjacent carriers to slide past each other. At the transfer locations the carriers of a moving track will be rotated at both ends thereof through 180 degrees round a horizontal rotation axis running parallel to the longitudinal direction of the carriers. Due to the inevitable play a minimal distance between the carriers is required so as to prevent mutual contact between adjacent pusher shoes. The device according to the invention has the additional advantage that this distance can be chosen relatively small.

A further preferred embodiment of the invented transport device is characterized in that the guide channel forms a switch between two guide channels running in the direction of displacement, wherein the engaging surface of the switch has at the release position of the guide pin a curvature which reduces the kinetic energy of the pusher shoe in the direction transversely of the direction of displacement of the objects. A relatively low-noise operation of the device is hereby obtained. Due to mass inertia a pusher shoe will generally "shoot" to the side of the moving track at a switch, wherein it comes to a stop when it arrives against the side. This produces noise nuisance. Owing to the above described feature the pusher shoe is diverted more strongly in the direction of displacement of the objects, whereby the latter come to lie against the side with less force, or do not do so at all.

Great forces generally occur during switching from one guide channel to another guide channel. In order to prevent wear occurring and to also ensure that noise nuisance is prevented as far as possible, at least a part of the switches is preferably manufactured from a wear-resistant plastic, such as for instance polyolefins, preferably with a high-density, and/or polyamides.

The invention also relates to a transport device for objects, comprising a frame provided with a series of carriers which run mutually parallel and which are pivotally coupled to at least one endless drivable moving track so as to enable displacement thereof in a direction of displacement, wherein at least some of the carriers are provided with pusher shoes which are shiftable along the relevant carriers transversely of the direction of displacement using guide means arranged on the frame, wherein the pitch between two pusher shoes situated on successive carriers amounts to a maximum of 130 mm, and at least some of the carriers have an arcuate upper surface in the width direction thereof. A transport device is hereby obtained wherein a high throughput speed can be achieved without this causing problems in the transfer of objects from one part of the device to another part thereof, or to another transport device according to the invention. This is particularly the case for relatively small objects.

Other preferred variants include transport devices wherein the pitch is a maximum of 115 mm, more preferably a maximum of 105 mm, and most preferably lies between about 100 and 105 mm, and wherein the radius of curvature of the arcuate upper surface lies between 100-800 mm, more preferably between 150-500 mm, most preferably between 200-300 mm, wherein any combination of said pitches and radii of curvature is possible.

The invention will now be further elucidated on the basis of the non-limitative preferred embodiments of a transport device according to the invention described in the figures.

BRIEF DESCRIPTION OF THE DRAWINGS

In the figures:

FIG. 4A shows a schematic cross-section of a pusher shoe with guide means and carrier according to the invention;

DETAILED DESCRIPTION

Figure 1:
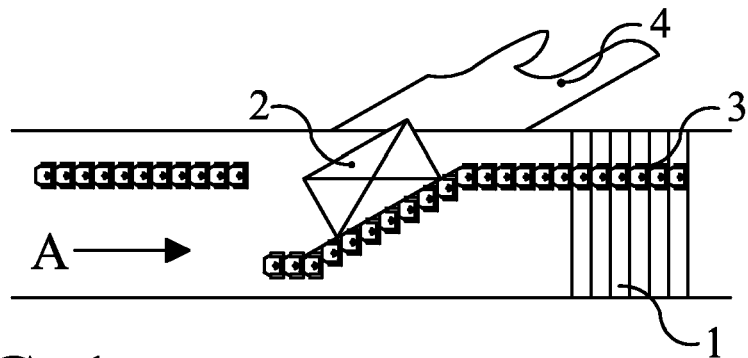
FIGS. 1-3 show schematic top views of an exemplary embodiment of the transport device according to the invention, wherein different stages of the displacement of an object are shown.
Figure 2:
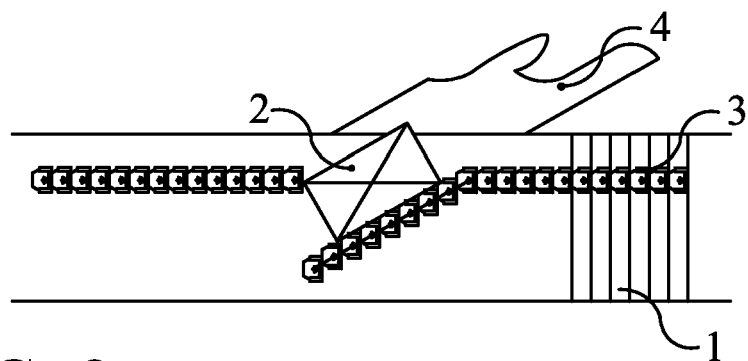
Figure 3:
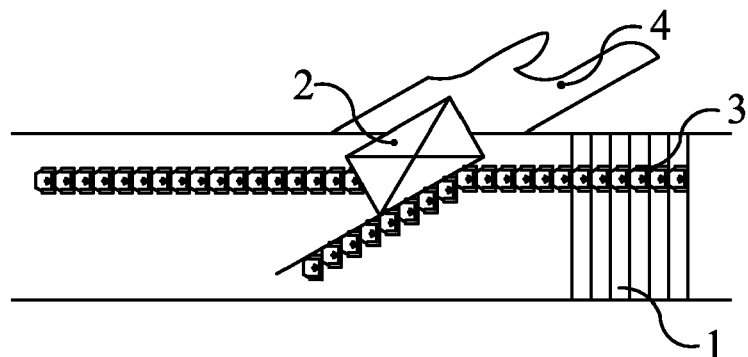

With reference to the figures a transport device is shown with a series of carriers 1 which run mutually parallel and only several of which are shown in FIGS. 1-3. Using an endless moving track the carriers 1 are connected to form an endless whole, on the upper surface of which objects 2 can be displaced in the direction A indicated in FIG. 1. Pusher shoes 3 are coupled to carriers 1, this such that they are shiftable relative to carriers 1 in a direction perpendicularly of direction A or, in other words, in the longitudinal direction of the carriers 1 themselves. Connecting to the sides of the transport device can be provided discharge chutes 4 (or a second transport device) and the like, using which objects 2 delivered from the transport device onto these discharge chutes 4 can be further transported. In order to enable pushing of objects 2 to a discharge chute 4 the transport device is provided at the position of such a discharge chute 4 with means with which a desired number of pusher shoes can be displaced from one side of the transport device (in FIGS. 1-3 this is the bottom side) to the opposite side of the transport device. An object 2 is carried along and set down on discharge chute 4 through the displacement of pusher shoes 3.

Figure 4B:
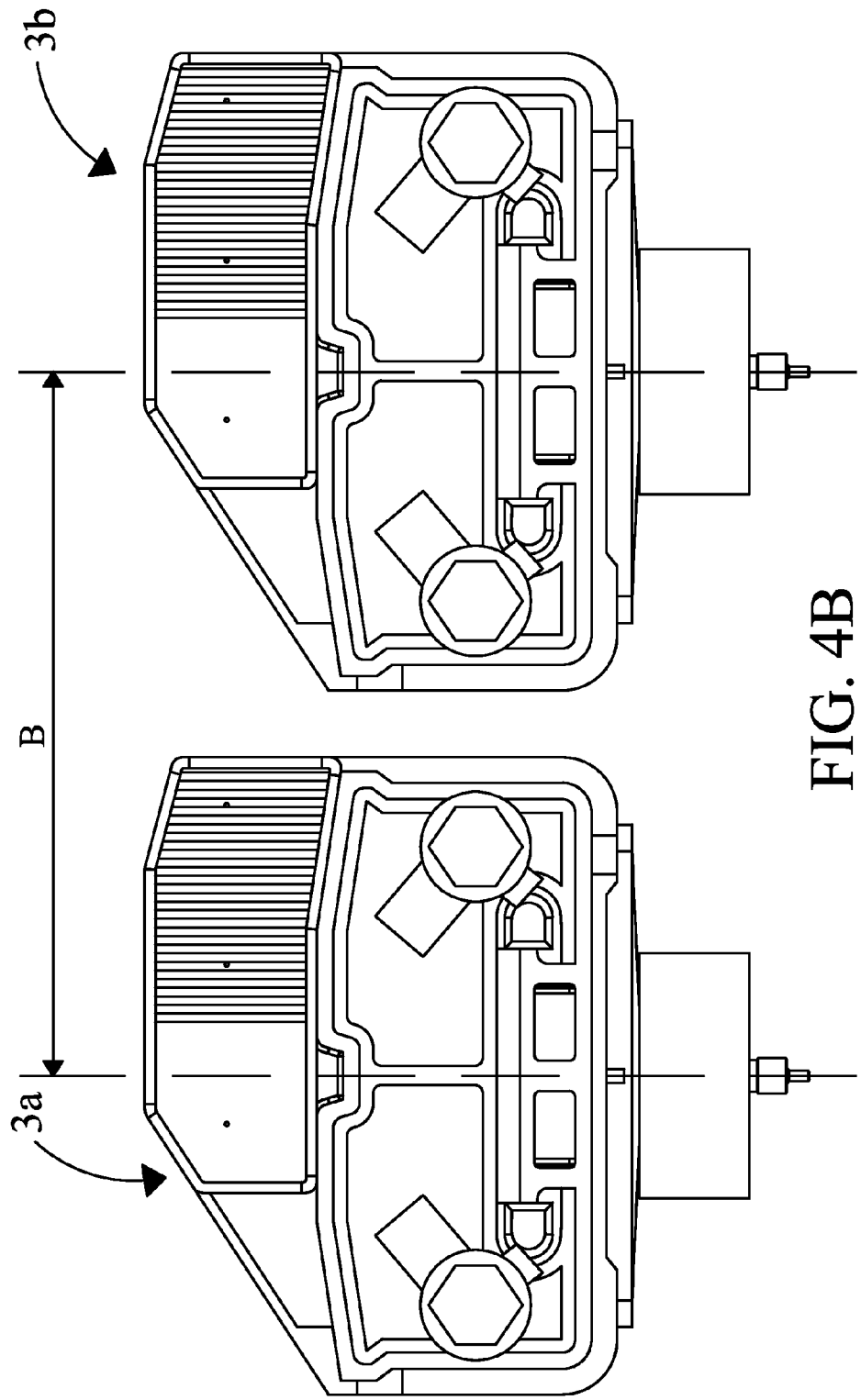
FIG. 4B shows a schematic cross-section of two successive pusher shoes with guide means and carrier according to the invention.

Referring to FIG. 4A, a carrier 1 according to the invention is shown. The carrier is generally plank-like and has a width such that the pitch between pusher shoes 3 situated on successive carriers amounts to a maximum of 125 mm, more preferably a maximum of 105 mm, for instance 101.6 mm. Within the context of this application the pitch is defined as the horizontal distance between the central axes of two successive pusher shoes 3a and 3b, as indicated in FIG. 4B with the letter 'B'. In the shown example the pitch B=101.6 mm. Carrier 1 is preferably an extruded profile, preferably of aluminium, which is provided with an arcuate upper surface 5 for supporting objects 2 to be displaced. The radius of curvature of acuate upper surface 5 can be chosen within broad limits, this depending on the dimensions and form of the object 2 to be displaced. However, the radius of curvature preferably lies between 100 and 800 mm. In the shown example the radius of curvature is 250 mm. Two side walls 6 and 7 running practically parallel to each other in lengthwise direction of carrier 1 connect to upper surface 5. Two substantially U-shaped wall parts 8 and 9, which form inward directed open spaces 10 and 11, are connected to the underside of side walls 6 and 7. The profile is further provided with stiffening ribs 16 in order to give carriers 1 sufficient bending stiffness and mount them on the moving track. Arranged round the carrier profile is a pusher shoe 3, preferably of a plastic suitable for this purpose. Pusher shoe 3 comprises a base 21, to the longitudinal edges of which connect upright wall parts 22 and 23. Base 21 comprises outward directed guide edges 24 and 25 which extend in open spaces 10 and 11 and are accommodated for close-fitting sliding therein. Above upper surface 5 of carrier 1 the pusher shoe 3 is provided with a block-shaped part 26. As can be seen in FIGS. 1-3, block-shaped part 26 is almost trapezoidal on the rear side thereof (relative to transport direction A), the side walls of which part form two practically vertical pushing surfaces 27, one of which will lie against an object 2 during displacement thereof, as shown schematically in FIGS. 1-3. As further shown in FIG. 4, sliding pieces 12 and 13 are arranged in at least a part of openings 10 and 11 between pusher shoe 3 and carrier 1. These sliding pieces comprise rubber encased in sliding plastic, and provide for a good guiding of pusher shoe 3 over carrier 1, among other reasons because sliding pieces 12 and 13 are received with sliding fit in openings 10 and 11. The sliding plastic, such as for instance HDPE and/or PTFE, ensures a low frictional resistance between the relatively moving surfaces. The rubber core serves as expansion piece and practically permanent pressure means, wherein use is made of the almost absent transverse contraction of rubber (Poisson coefficient of about 0.5). Because the play between pusher shoe 3 and carrier 1 falls further due to this measure, rattling and other noise nuisance is reduced. In another variant the rubber core covered with the plastic is applied as closing piece for an aluminium profile of carrier 1 and/or the moving track, whereby it can serve as end piece. It is advantageous here to have the inner wall of the aluminium profile, which receives the rubber piece, run obliquely relative to the axial direction of the profile so as to prevent accumulation of dirt.

Figure 5A:
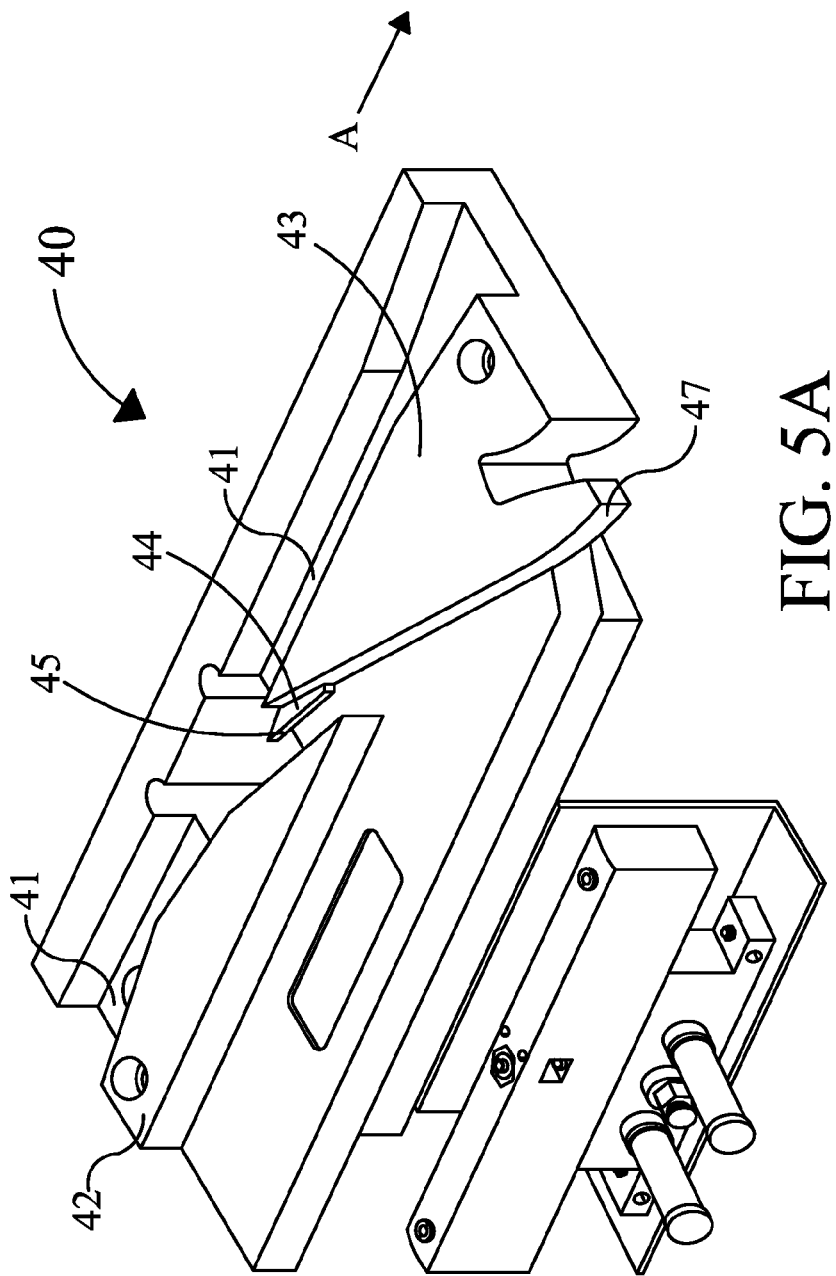
FIG. 5A shows a schematic top view of a switch in a guide channel according to the invention in a first position.
Figure 5B:
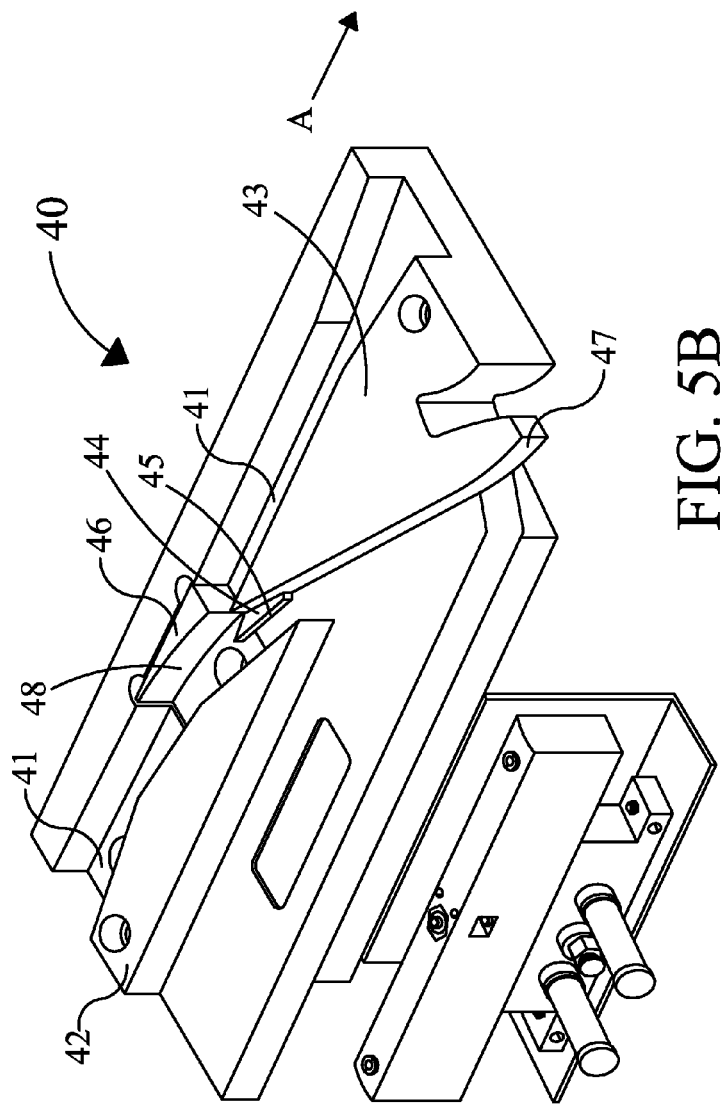
FIG. 5B shows a schematic top view of a switch in a guide channel according to the invention in a second position.
Figure 6:
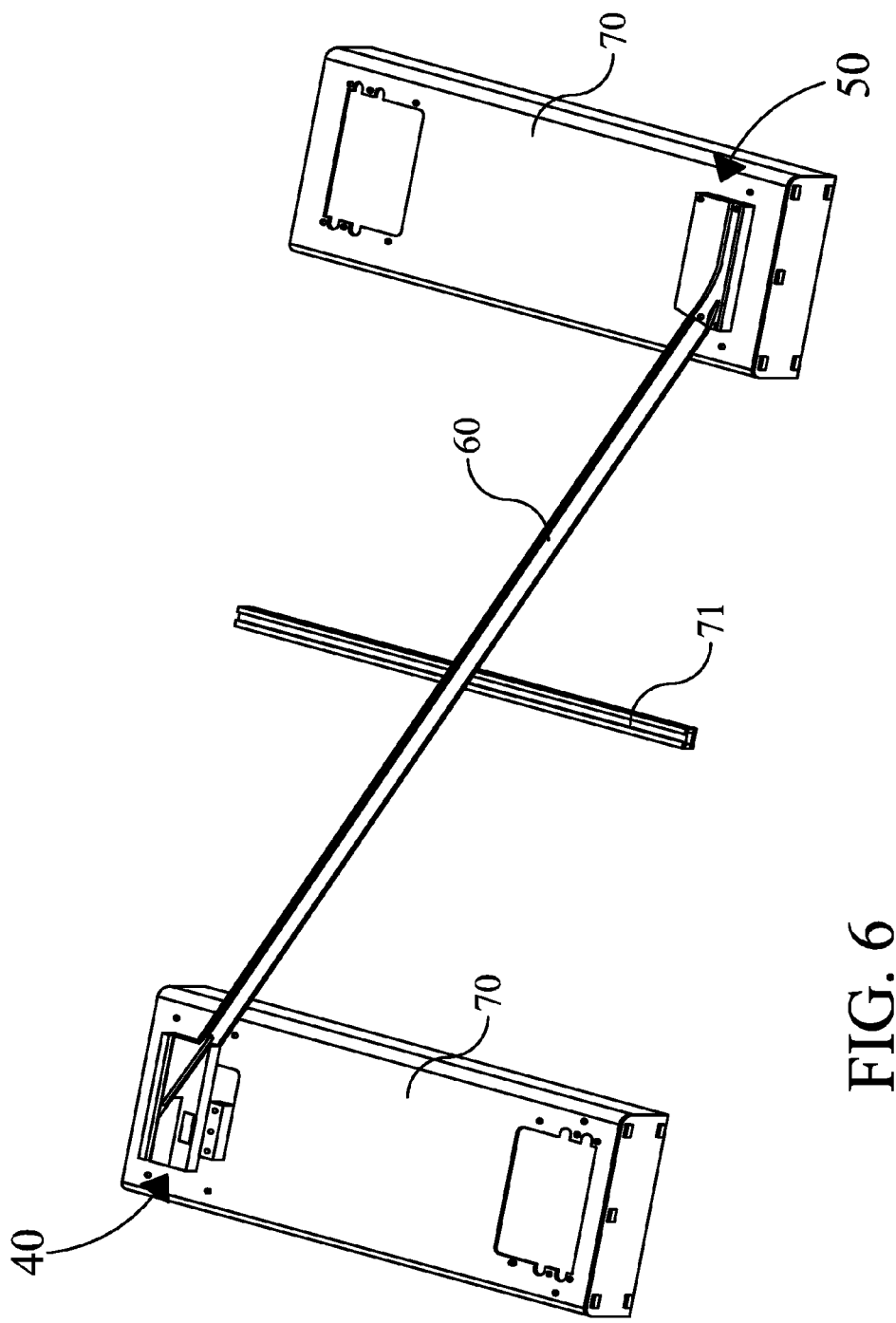
FIG. 6 shows a schematic top view of a switch system according to the invention.
Figure 7:
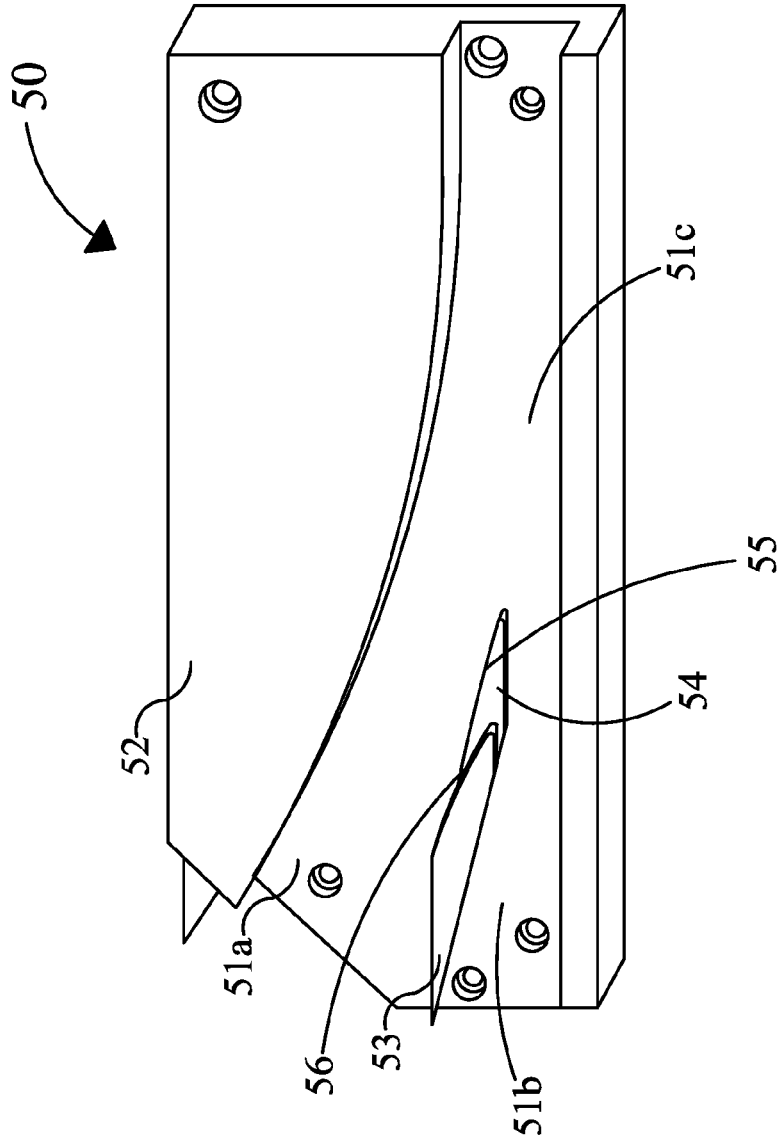
FIG. 7 finally shows a schematic top view of a main guide entrance according to the invention.

Pusher shoes 3 preferably further comprise a guiding construction 30 which can realize the transverse displacement of pusher shoes 3 in co-action with guide means 40 arranged on the frame of the transport device. According to a preferred variant of the invention, guiding construction 30 comprises a guide pin 31 with a guide wheel 32 arranged thereon, wherein guide pin 31 comprises at least two parts 31a, 31b of differing diameter. Guiding construction 30 co-acts with guide means 40 connected to the frame (not shown). Guide means 40 can occur in multiple variants, depending on the function they are to fulfil. FIG. 6 shows three possible variants of guide means according to the invention. The shown switch system comprises a first variant of guide means in the form of a switch 40, a second variant in the form of a main guide entrance 50 and a third variant in the form of a wheel guide 60. The guide means are mounted on the frame (not shown) by means of anchoring plates 70 and/or anchoring bar 71. Depending on the position of switch 40, a pusher shoe will be diverted to wheel guide 60 by its guiding construction engaging in switch 40, whereby the pusher shoe will be moved sideways relative to the direction of forward movement. At the position of the end point of wheel guide 60 the pusher shoe will be diverted to the main guide (not shown) by its guiding construction engaging in entrance 50. A switch 40 according to the invention is shown in top view in FIGS. 5A and 5B and comprises a guide channel or channels 41 between elevated wall parts 42, 43. Pusher shoe 3 is disposed relative to guide channel 41 such that guiding construction 30 can engage at least partially therein. A portion 44 of channel 41 is elevated relative to the level of the bottom of the channel and has a side surface 45. The switch is further provided with a switch blade 46 which can take up at least a first and a second position. The switch blade has a curved side surface 48 along which at least a part of guiding construction 30 can be guided. The first (lower) position of switch blade 46 (see FIG. 5A) corresponds with a non-switching movement wherein pusher shoe 3 moves straight on. The second position (shown in FIG. 5B) corresponds with a switching movement wherein the thicker pin portion 31a in the first instance comes into contact with surface 48, whereby the pusher shoe is diverted in the direction of surface 47 and an acceleration occurs in the transverse direction (at right angles to throughput direction A). At the position of the transition from switch blade 46 to part 44 the movement is taken over by the thinner pin portion 31b, which will move along surface 45, wherein substantially only guiding forces occur. At the position of the transition from part 44 to part 43 the movement is taken over once again by the thicker pin portion 31a, which will move along surface 47. By providing a stepped pin 31 and raised wall part 44, switch blade 46 can be switched sooner from the second position to the first, whereby a higher throughput speed can be achieved at the same switching speed, this enhancing the capacity of the transport device accordingly. Guide wheel 32 takes over the engagement at the position of the transition from switch 40 to wheel guide 60 (see FIG. 6), wherein a force is substantially exerted by the object 2 to be displaced. Situated at the position of the outer end of wheel guide 60 is an entrance which is shown in detail in FIG. 7. Entrance 50 according to the invention comprises a guide channel or channels 51a, 51b, 51c between elevated wall parts 52, 53. The main guiding is formed by channels 51b and 51c. Channel 51a connects to wheel guide 60. Elevated wall part 53 has a curved side surface 56. Pusher shoe 3 is disposed relative to guide channels 51 such that guiding construction 30 can engage at least partially therein. A part 54 of entrance 50 is raised relative to the level of the bottom of the channel and has a side surface 55. According to the invention a pusher shoe will be guided out of wheel guide 60 into channel 51a, wherein at least a part of guiding construction 30 will be guided along curved surface 56. According to the invention the thicker pin portion 31a will in the first instance come into contact with surface 56, whereby the pusher shoe is diverted in the direction of main guide 51c. At the position of the transition from raised wall part 53 to part 54 the movement is taken over by the thinner pin portion 31b, which will move along surface 55, wherein substantially only guiding forces occur. The height of wall parts 53 and 54 is adjusted here such that engagement with pin portions 31a and 31b respectively can take place. At the position of the transition from part 54 to main guide 51c the movement is taken over once again by the thicker pin portion 31a. By providing a stepped pin 31 and an elevated wall part 54 which extends further into main guide 51c than wall part 53, and by providing at least surface 56 with a curve running in the direction of main guide 51c, the kinetic energy of pusher shoe 3 in the direction transversely of the direction of displacement of objects 2 is reduced. Pusher shoe 3 is hereby steered more tangentially to the side (instead of transversely of the side) when being side-tracked from the moving track, whereby pusher shoe 3 is moved relatively gently against the side. This reduces the noise nuisance considerably.

What is claimed is:

1. A transport device for objects, comprising a frame provided with a series of carriers which run mutually parallel and which are pivotally coupled to at least one endless drivable moving track so as to enable displacement thereof in a direction of displacement, wherein at least some of the carriers are provided with pusher shoes which are shiftable along the relevant carriers transversely of the direction of displacement using guide means arranged on the frame, wherein the pusher shoes comprise a guiding construction which, in co-action with the guide means of the frame, brings about the displacement of the pusher shoes, characterized in that the guiding construction comprises a guide pin with a guide body arranged thereon, wherein the guide pin comprises at least two portions of differing diameter, that the guide means comprise a guide channel in which the guide pin can engage, and that the depth of the guide channel progresses such that, at first engagement, the portion of the guide pin with the largest diameter engages in the guide channel, and with further progression, the portion of the guide pin with the smaller diameter engages in the guide channel.

2. The transport device as claimed in claim 1, characterized in that the pitch between two pusher shoes situated on successive carriers amounts to a maximum of 130 mm.

3. The transport device as claimed in claim 2, characterized in that the pitch amounts to a maximum of 105 mm.

4. The transport device as claimed in claim 1, characterized in that at least some of the carriers have an arcuate upper surface in the width direction thereof.

5. The transport device as claimed in claim 4, characterized in that the radius of curvature of the arcuate upper surface lies between 100-800 mm.

6. The transport device as claimed in claim 5, characterized in that the radius of curvature lies between 150-500 mm.

7. The transport device as claimed in claim 5, characterized in that the radius of curvature lies between 200-300 mm.

8. The transport device as claimed in claim 1, characterized in that it is provided with at least one main guide entrance with guide channel, wherein the depth of the guide channel progresses such that at first engagement the portion of the guide pin with the largest diameter engages in the guide channel, and with further engagement a portion with a smaller diameter.

9. The transport device as claimed in claim 1, characterized in that the depth of the guide channel progresses such that with even further engagement the guide body engages in the guide channel.

10. The transport device as claimed in claim 1, characterized in that the guide channel forms a switch between two guide channels running in the direction of displacement, wherein the engaging surface of the switch has at the release position of the guide pin a curvature which increases the kinetic energy of the pusher shoe in the direction of displacement of the objects relative to the kinetic energy in the direction transversely thereof.

11. A transport device for objects, comprising a frame provided with a series of carriers which run mutually parallel and which are pivotally coupled to at least one endless drivable moving track so as to enable displacement thereof in a direction of displacement, wherein at least some of the carriers are provided with pusher shoes which are shiftable along the relevant carriers transversely of the direction of displacement using guide means arranged on the frame, characterized in that the pitch between two pusher shoes situated on successive carriers amounts to a maximum of 130 mm, and that at least some of the carriers have an arcuate upper surface in the width direction thereof.

12. The transport device as claimed in claim 11, characterized in that the radius of curvature of the arcuate upper surface lies between 200-300 mm.

\* \* \* \* \*

UNITED STATES PATENT AND TRADEMARK OFFICE
CERTIFICATE OF CORRECTION

| | | |
|---|---|---|
| PATENT NO. | : 8,069,969 B2 | Page 1 of 1 |
| APPLICATION NO. | : 12/296447 | |
| DATED | : December 6, 2011 | |
| INVENTOR(S) | : Casper Hermanus Gerardus Vlug | |

It is certified that error appears in the above-identified patent and that said Letters Patent is hereby corrected as shown below:

On the Title page insert item [30]

--(30)    Foreign Application Priority Data
     April 10, 2006    (NL)   ............................. 2000049--

Signed and Sealed this
Fourteenth Day of February, 2012

David J. Kappos
*Director of the United States Patent and Trademark Office*